Patented Jan. 30, 1945

2,368,186

UNITED STATES PATENT OFFICE 2,368,186

PRODUCTION OF PYRAN DERIVATIVES

Jacob N. Wickert, South Charleston, and Benjamin T. Freure, Charleston, W. Va., assignors to Carbide and Carbon Chemicals Corporation, a corporation of New York No Drawing. Application January 16, 1942, Serial No. 427,000

19 Claims. (Cl. 260—333)

This invention relates to the production of aldehydo and alkanoyl derivatives of pyran and homologues thereof; and more especially it concerns the production of such derivatives by the catalytic hydrogenation, in either the vapor phase or liquid phase, of a pyran derivative produced in connection with known processes for the manufacture of crotonaldehyde from acetaldehyde. It has special utility for the production of 3-methanoyl-2,6-dimethyltetrahydropyran (which may also be designated as 2,6-dimethyltetrahydro-3-formylpyran); and 2,6-dimethyltetrahydro-3-hydroxymethylpyran (which may also be designated as 3-hydroxymethyl-2,6-dimethyloxane); by the catalytic hydrogenation of the 2,6-dimethyl-5,6-dihydro-3-formylpyran present in the so-called "crotonaldehyde oils" or high-boiling oily by-products formed during the manufacture of crotonaldehyde from acetaldehyde.

Processes are now in use for the commercial production of crotonaldehyde involving the condensation of acetaldehyde in the presence of an aqueous caustic alkali condensing agent, whereby the acetaldehyde is transformed to acetaldol. Upon dehydration of the resultant product in the presence of an aqueous sulfuric acid solution, a mixture of acetaldehyde, crotonaldehyde, water and by-products is obtained, from which the acetaldehyde and crotonaldehyde may be separated by successive distillations in well-known manner. In the column employed for distilling the crotonaldehyde, certain volatile oils or high-boiling by-products tend to accumulate, and these may be separated and withdrawn from the column. Otherwise they are discharged at the base of the still to the sewer. These oils often amount to as high as 5% of the crotonaldehyde production, and are composed of a mixture of various substances. The oils vary in composition depending in part upon the point in the column at which such oils are removed. However, the main constituent has now been identified as 2,6-dimethyl-5,6-dihydro-3-formylpyran, generally known as a dimer of crotonaldehyde. Vinyl crotonaldehyde, n-hexadienal, n-octatrienal and other materials also are present in these oils.

The aforesaid 2,6-dimethyl-5,6-dihydro-3-formylpyran has a boiling point of 195.2° C. at atmospheric pressure; and it has a specific gravity at 20°/20° C. of 1.0114, and a refractive index at 20° C. of 1.4750. It is soluble in water at 20° C. to an amount 4.6% by weight; and it has a chemical structure apparently designated by the formula:

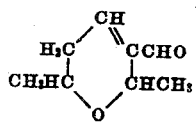

The present invention is based upon the discovery that valuable aldehydo and alkanoyl derivatives of the last-named compound may be produced by hydrogenating the said compound, or the high-boiling oily by-products or so-called "crotonaldehyde oils" from the process of making crotonaldehyde, preferably under relatively mild conditions of pressure and temperature, in the presence of an active hydrogenation catalyst such as nickel. A nickel catalyst composed of a nickel-silicon alloy, such as described in the United States Patent 1,563,587 of M. Raney, is particularly suitable. The hydrogenation is so conducted that the reactive aldehyde group in the compound is unaffected, but that the unsaturation in the cyclic nucleus is eliminated, yielding a saturated aldehyde derivative. Upon further hydrogenation the carbonyl group of the aldehyde is reduced to a carbinol group.

When conducting the hydrogenation in the liquid phase for the production of the saturated heterocyclic aldehyde, in the presence of an active hydrogenation catalyst such as the aforesaid "Raney" nickel catalyst, it is advantageous to use pressures ranging between 500 and 1000 pounds per square inch, and elevated temperatures below 100° C. Conditions of pressure and temperature disclosed in Example 3 appearing hereinafter are preferred, although temperatures ranging between around room temperature (around 20° C.) and around 300° C. may be effectively employed. The lower temperature limit is dependent in part upon the activity of the catalyst and in part upon the hydrogen pressure employed; while the upper temperature limit is fixed by the instability of the compounds present and by the degree of activity of the catalyst. When it is desired to obtain a minimum of the saturated heterocyclic alcohol the hydrogenation preferably is discontinued before one mole of hydrogen is absorbed per mole of the unsaturated aldehyde starting material. For complete hydrogenation of the latter to form the hydroxymethylpyran derivative, a final temperature of at least 150° C. and a hydrogen pressure of 1000 pounds per square inch conveniently may be employed. The maximum hydrogenation temperature should not exceed 200° C. for active catalysts such as the various nickel catalysts. Temperatures as high as around 300° C. may be employed in conjunction with less active catalysts, such as copper, cobalt, iron and copper chromate.

Where the hydrogenations are conducted in the vapor phase in the presence of a catalyst such as nickel, carried by a suitable support, temperatures ranging between around 100° C. and around 300° C. are employed. The lower temperature limit is fixed by the volatility of the substrate and products, while the upper temperature limit is again fixed by the instability of the compounds present, and the activity of the catalyst. The principal products may be the saturated aldehyde or the alcohol, depending upon such readily controlled factors as the activity of the catalysts selected, the time of contact of the reactants, the reaction temperature, and the ratio of hydrogen to substrate. Enough hydrogen must be present to maintain the substrate and products above the dewpoints thereof, but a much larger proportion of hydrogen is desirable for practical operations.

During the hydrogenation of "crotonaldehyde oils," the various associated compounds mentioned hereinbefore are hydrogenated, and the resultant products appear in the head or tail cuts during the subsequent distillation of the hydrogenated products.

The following examples will serve to illustrate the invention:

*Example 1*

Four kilograms of volatile high-boiling oils obtained as by-products in crotonaldehyde manufacture were hydrogenated in a steel pressure vessel, using as catalyst about 5% by weight of reduced nickel derived from nickel formate. A hydrogen pressure of between 500 and 700 pounds per square inch, gauge, and temperatures within the range between 150° and 170° C., were employed. The reaction proceeded rapidly, yielding a crude product which consisted chiefly of the compound, 2,6-dimethyltetrahydro-3-hydroxymethylpyran. This crude product was cooled to room temperature, filtered, and the filtrate distilled under vacuum, yielding 1652 grams of products boiling between 98° C., under 15 mm. of mercury, absolute pressure, and 100° C., under 10 mm. of mercury, absolute pressure. Upon redistillation of these crude products, a good yield of 2,6-dimethyltetrahydro-3-hydroxymethylpyran was secured. This compound when pure has a boiling point of 91° C. under an absolute pressure of 10 mm. of mercury, and has a boiling point of around 211° C. at atmospheric pressure, a specific gravity at 20°/20° C. of 0.9927, and a refractive index at 20° C. of 1.4617. The compound is completely miscible in water in all proportions at 20° C.

*Example 2*

The hereinbefore mentioned high-boiling by-products from crotonaldehyde production were fractionally distilled, and the main fraction, boiling between 67° and 72° C. under an absolute pressure of 8 mm. of mercury, was mixed with 6% of its weight of a nickel-silicon alloy catalyst of the type described in the aforesaid Raney patent, and the mixture was placed in a steel pressure vessel. The mixture was then hydrogenated under a hydrogen pressure which was gradually increased to a maximum of 500 pounds per square inch, gauge, while the temperature of the pressure vessel and contents was increased slowly to 165° C. The reaction became vigorous at 90° C. Upon distillation under vacuum of the crude reaction mixture thus produced, there were obtained 2138 grams of a product boiling within the range between 95° and 99° C., under an absolute pressure of 8 mm. of mercury. Further purification of this product was effected by treatment thereof in methanolic caustic alkali at room temperature, and subsequent distillation under vacuum, yielding the 2,6-dimethyltetrahydro-3-hydroxymethylpyran recited in Example 1.

*Example 3*

One gallon of 2,6-dimethyl-5,6-dihydro-3-formylpyran was placed in a steel bomb with 2.5% of its weight of nickel from the nickel-silicon alloy described in Example 2, and the mixture was subjected for six hours to the action of hydrogen at 65° C., under a pressure ranging between 600 and 900 pounds per square inch. The absorption of hydrogen then became slow, indicating saturation of the olefine bond had been effected.

The reaction mixture was cooled and filtered, and the filtrate distilled under vacuum. About 80% of the mixture thus distilled boiled between 65° and 68° C., under an absolute pressure of 8 mm. of mercury, and consisted of the saturated aldehyde, 2,6-dimethyltetrahydro-3-formylpyran. This compound has a specific gravity at 20°/20° C. of 0.9870, and a refractive index at 20° C. of 1.4464.

*Example 4*

Water-distilled "crotonaldehyde oil," obtained as by-products in crotonaldehyde manufacture, and containing approximately 80% of 2,6-dimethyl-5,6-dihydro-3-formylpyran, was hydrogenated under the following conditions, in a hydrogenation apparatus which consisted of a feed tank under pressure; a 0.5-inch diameter electrically-heated preheater 3 feet long; and a jacketed 3-inch diameter steel tube 7 feet long, filled with around 25 pounds of a porous acid-proof mineral substance composed essentially of silica and marketed under the trade name "Filtros," the same being in the form of chips impregnated with about 10% of its weight of a nickel catalyst. During a period of 14.5 hours 5736 grams of water-distilled "crotonaldehyde oil" vapors were passed through the apparatus while maintaining the preheater at an average temperature of 160° C., and the main reaction vessel at a temperature ranging between 160° and 175° C., and while maintaining the apparatus under a pressure of 27 pounds per square inch, gauge. Hydrogen was passed through the apparatus concurrently with the "crotonaldehyde oil" vapors in an average molar ratio of hydrogen to aldehyde of 150 to 1, and at an average total feed rate of 396 grams per hour. The condensed vapors from the reaction yielded a distillate having a specific gravity at 20° C. of 0.970. Fractional distillation thereof under vacuum yielded, among others, a fraction boiling between 97° and 103° C., under an absolute pressure of 15 mm. of mercury, which consisted principally of 2,6-dimethyltetrahydro-3-hydroxymethylpyran. This compound also may be appropriately designated as 3-hydroxymethyl-2,6-dimethyloxane. An authority for this latter designation is "The Ring Index," by A. M. Patterson and L. T. Capell, published by Reinhold Publishing Corporation.

Where it is desired to produce in the vapor phase the saturated heterocyclic aldehyde instead of the corresponding alcohol, the procedure recited in Example 4 may be followed, with the exception that a higher aldehyde feed rate is employed; and the molar ratio of hydrogen to the unsaturated heterocyclic aldehyde is decreased, preferably to a ratio of around 20 to 1.

The novel compounds produced in accordance with this invention have utility for a wide variety of purposes. Thus, the heterocyclic alcohol may be used as wool scouring agents and the like. The alcohol derivative has been converted into various esters having potential utility as plasticizers for synthetic resins. Thus, the said alcohol has been converted to the corresponding maleate derivative, boiling at 205° C. under an absolute pressure of 3 mm. of mercury; into the corresponding succinate derivative, which boils at 199° C. under an absolute pressure of 2 mm. of mercury; and into the corresponding phthalate, boiling at 235° C. under an absolute pressure of between 1 and 2 mm. of mercury. The compounds produced by the present process may be used as starting materials for the production of other derivatives thereof.

The invention is defined by the accompanying claims.

We claim:

1. As new chemical compounds, saturated derivatives of dimethyltetrahydropyran, the same having chemical structures corresponding to the formula

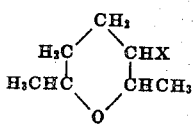

wherein X designates a radical selected from the group consisting of the formyl radical and the hydroxymethyl radical.

2. As a new chemical compound, a saturated dimethyltetrahydroformylpyran, the same boiling at around 67° C. under an absolute pressure of 10 mm. of mercury, and boiling at about 187.5° C. at atmospheric pressure, and having a specific gravity at 20°/20° C. of 0.9870, and a refractive index at 20° C. of 1.4464.

3. As a new chemical compound, a saturated dimethyltetrahydroxymethylpyran, the same being a water-miscible liquid boiling at around 211° C. at atmospheric pressure and at about 91° C. under an absolute pressure of 10 mm. of mercury, the same having a specific gravity at 20°/20° C. of 0.9927, and a refractive index at 20° C. of 1.4617.

4. Process for making a saturated oxygenated derivative of dimethyltetrahydropyran, which comprises reacting a dimethyldihydro-3-formylpyran with hydrogen at a temperature within the range between around 20° C. and around 300° C., in the presence of a hydrogenation catalyst, and recovering the dimethyltetrahydropyran derivative thus produced.

5. Process which comprises reacting a dimethyl-dihydro-3-formylpyran with hydrogen under superatmospheric pressure at a temperature within the range between around 20° C. and around 300° C., in the presence of a hydrogenation catalyst.

6. Process which comprises reacting a dimethyl-dihydro-3-formylpyran in the liquid phase with hydrogen under superatmospheric pressure, at a temperature ranging between around 20° C. and around 200° C., in the presence of a nickel catalyst.

7. Process which comprises reacting a dimethyl-dihydro-3-formylpyran in the liquid phase with hydrogen under superatmospheric pressure, at a temperature ranging between around 150° C. and around 200° C., in the presence of a nickel catalyst, and recovering from the resultant reaction products the resultant dimethyltetrahydro-3-hydroxymethylpyran thus produced.

8. Process which comprises reacting a dimethyldihydro-3-formylpyran in the liquid phase with hydrogen under superatmospheric pressure, at a temperature ranging between around 20° C. and around 200° C., in the presence of a nickel catalyst, and separately recovering from the resultant reaction products the dimethyltetrahydro-3-formylpyran thereby produced.

9. Process which comprises reacting a dimethyldihydro-3-formylpyran in the vapor phase with hydrogen at a temperature within the range between around 100° C. and around 300° C., in the presence of a hydrogenation catalyst, and separately recovering from the resultant reaction products at least one member of the group consisting of the dimethyltetrahydro-3-formylpyran and the dimethyltetrahydro-3-hydroxymethylpyran thereby produced.

10. Process which comprises reacting a dimethyldihydro-3-formylpyran in the vapor phase with hydrogen at a temperature within the range between around 100° C. and around 300° C., in the presence of a nickel catalyst, and separately recovering from the resultant reaction products at least one member of the group consisting of the dimethyltetrahydro-3-formylpyran and the dimethyltetrahydro-3-hydroxymethylpyran thereby produced.

11. Process which comprises hydrogenating an oily mixture containing a dimethyldihydro-3-formylpyran at a temperature within the range between around 20° C. and around 300° C., in the presence of a hydrogenation catalyst, said oily mixture being formed during the conversion of acetaldol into crotonaldehyde in the presence of a condensing agent and the distillation of the reaction mixture.

12. Process which comprises hydrogenating an oily mixture containing a dimethyldihydro-3-formylpyran under superatmospheric pressure and at temperatures within the range between around 20° C. and around 300° C., in the presence of a hydrogenation catalyst, said mixture boiling between around 85° C. and around 90° C. under an absolute pressure of 18 mm. of mercury, and being isolated during distillation of the reaction mixture resulting from the conversion of acetaldol into crotonaldehyde in the presence of an acidic condensing agent.

13. Process which comprises hydrogenating an oily mixture containing a dimethyldihydro-3-formylpyran at a temperature within the range between around 20° C. and around 300° C., in the presence of a nickel catalyst, said oily mixture being formed during the conversion of acetaldol into crotonaldehyde in the presence of a condensing agent and the distillation of the reaction mixture.

14. Process which comprises hydrogenating an oily mixture containing a dimethyldihydro-3-formylpyran at a temperature within the range between around 150° C. and around 300° C., in the presence of a hydrogenation catalyst, said oily mixture being formed during the conversion of acetaldol into crotonaldehyde in the presence of a condensing agent, and distillation of the reaction mixture, and recovering from the resultant reaction products the saturated methanoylpyran derivative thus produced.

15. Process which comprises hydrogenating an oily mixture containing dimethyldihydro-3-formylpyran in the vapor phase at a temperature ranging between around 100° C. and around 300° C., in the presence of a hydrogenation catalyst, and recovering from the resultant reaction mixture the saturated methanoylpyran derivative thus produced.

16. Process which comprises hydrogenating an oily mixture containing 2,6-dimethyl-5,6-dihydro-3-formylpyran at a temperature within the range between around 20° C. and around 200° C., in the presence of a hydrogenation catalyst, and recovering from the resultant reaction mixture the dimethyltetrahydro-3-formylpyran thus produced.

17. Process which comprises reacting a dimethyldihydro-3-formylpyran in the vapor phase with hydrogen in a molar ratio of around 1:20, respectively, and at a temperature within the range between around 100° C. and around 300° C., in the presence of a hydrogenation catalyst, and separately recovering from the resultant reaction products at least one member of the group consisting of the dimethyltetrahydro-3-formylpyran and the dimethyltetrahydro-3-hydroxymethylpyran thereby produced.

18. Process which comprises passing a stream of a dimethyldihydro-3-formylpyran in admixture with hydrogen through a reaction zone maintained at a temperature within the range between around 100° C. and around 300° C., in the presence of a hydrogenation catalyst, condensing the resultant vaporous reaction products, and recovering therefrom at least one member of the group consisting of the dimethyltetrahydro-3-formylpyran and the dimethyltetrahydro-3-hydroxymethylpyran thereby produced.

19. Process as defined in claim 18 wherein the hydrogenation catalyst is a nickel catalyst.

JACOB N. WICKERT.
BENJAMIN T. FREURE.